United States Patent [19]

Nakano

[11] Patent Number: 5,653,402
[45] Date of Patent: Aug. 5, 1997

[54] DEVICE FOR REMOVING ANY SHORT PAPER IN PAPER PROCESSING MACHINE

[75] Inventor: Masanori Nakano, Wakayama, Japan

[73] Assignee: Noritsu Koki Co., Ltd., Wakayama, Japan

[21] Appl. No.: 527,802

[22] Filed: Sep. 13, 1995

[30] Foreign Application Priority Data

Sep. 13, 1994 [JP] Japan ................................. 6-218872

[51] Int. Cl.$^6$ ...................................................... B65H 16/00
[52] U.S. Cl. ........................................................... 242/563
[58] Field of Search ................................. 242/563, 563.2, 242/564.4, 564.5; 355/72, 309, 311

[56] References Cited

U.S. PATENT DOCUMENTS

| | | | |
|---|---|---|---|
| 4,159,807 | 7/1979 | Honsel et al. | 242/563.2 |
| 4,549,805 | 10/1985 | Limori | 355/309 |
| 4,816,865 | 3/1989 | Hamano | 355/309 |
| 4,874,958 | 10/1989 | Sampath et al. | 355/309 |
| 5,107,296 | 4/1992 | Ozawa et al. | 355/72 |
| 5,144,361 | 9/1992 | Morisaki et al. | 355/72 |
| 5,187,531 | 2/1993 | Ozawa et al. | 242/563 |
| 5,237,378 | 8/1993 | McEwen | 355/309 |
| 5,542,350 | 8/1996 | Theilacker et al. | 242/563 |

*Primary Examiner*—John R. Darling
*Attorney, Agent, or Firm*—Wenderoth, Lind & Ponack

[57] ABSTRACT

A device removes a short web of paper that cannot be fed in a photoprinting machine and includes a first paper detecting sensor provided between an outer case and a paper magazine detachably mounted outside of the outer case. The outer case accommodates first feed rollers, second feed rollers, and a second paper detecting sensor provided downstream of the second feed rollers. Paper inserted into the outer case from the paper magazine is fed by the first feed rollers. If both the first sensor and the second sensor have detected the absence of the paper, the first feed rollers are deactivated to stop the feed of the paper with its rear end protruding from the outer case. In this state, the paper can be pulled out of the outer case by grabbing its rear end.

5 Claims, 7 Drawing Sheets

DEVICE FOR REMOVING ANY SHORT PAPER IN PAPER PROCESSING MACHINE

BACKGROUND OF THE INVENTION

This invention relates to a device for use in a paper processing machine such as a printing machine to remove any short web of printing paper.

Figure 7:
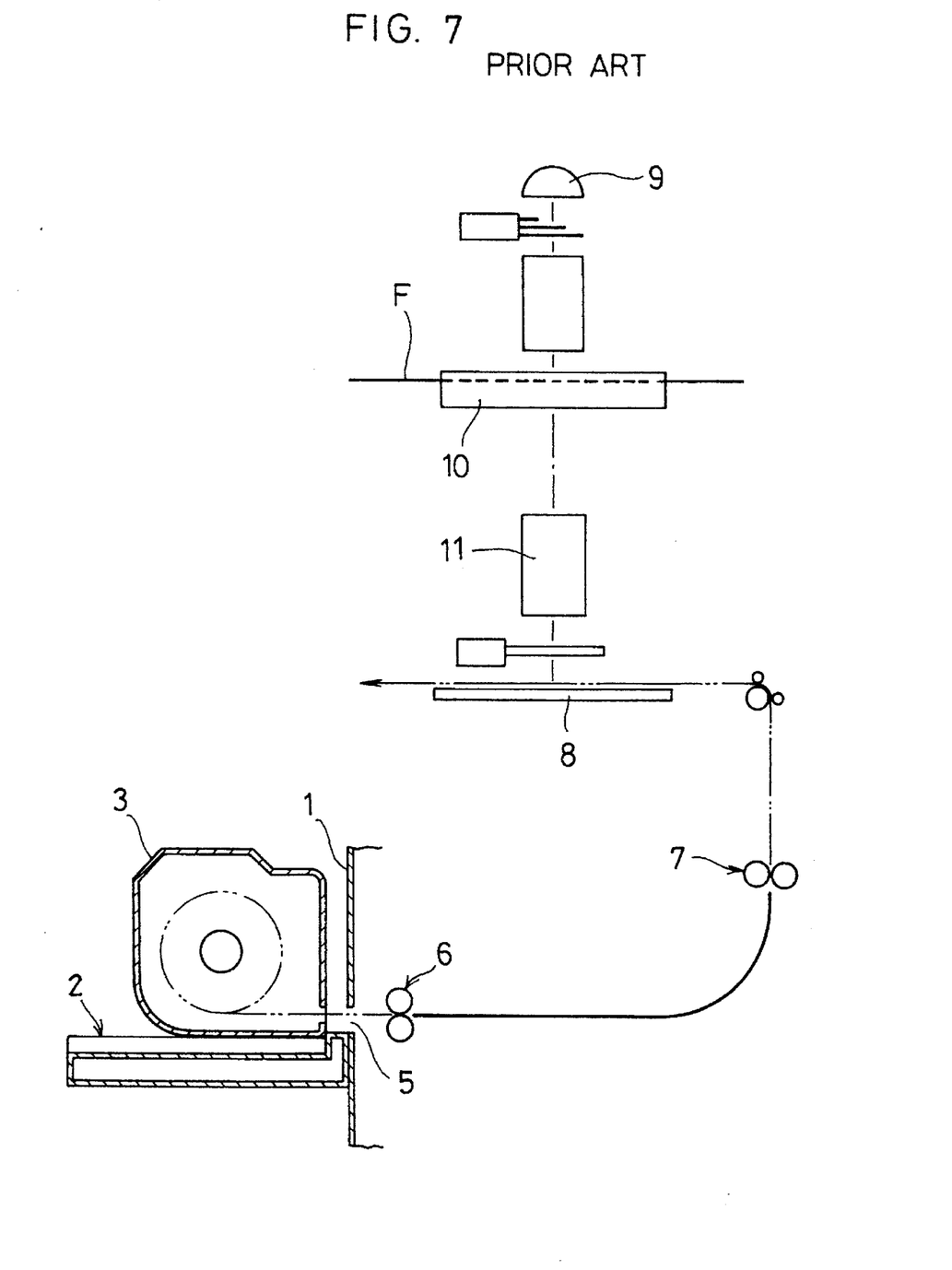
FIG. 7 is a schematic view of a conventional paper removing device.

FIG. 7 shows an ordinary photoprinting machine, in which negative images formed on a negative film F pulled into a negative mask 10 are printed onto printing paper P (hereinafter "paper P") by irradiating the film F.

Such papers P are available in several different widths. A paper of correct width is selected according to the print size. A paper is usually housed in a paper magazine 3 in a roll form.

Such a printing machine comprises an outer case 1, a magazine support 2 on which the paper magazine 3 is detachably supported, an exposure table 8 mounted in the outer case and an irradiating source 9. The paper P pulled out of the paper magazine 3 is inserted into the outer case 1 and is fed in the case 1 onto the exposure table 8 by rotating a plurality of feed rollers 6, 7 in the outer case 1.

When changing the print size, the paper P in the case 1 is pulled out of the case 1 back into the paper magazine 3, and the paper magazine is replaced with a new one housing a paper having a width corresponding to the new print size.

Since paper magazines are changed every time the print size changes, papers in some paper magazines 3 are sometimes shorter than the distance between the feed rollers 6 and 7.

If the paper P fed into the outer case 1 is shorter than the distance between the feed rollers 6 and 7, it is impossible to feed its leading end to the rollers 7, so that the paper P will be stuck between the rollers 6 and 7.

If this happens, after the preceding paper has been printed and discharged, such a short paper has to be removed by opening a cover of the outer case 1. This operation is extremely troublesome and time-consuming.

Also, it is necessary to provide the outer case 1 with the abovementioned cover so that the paper stuck in the case can be removed from the case. The provision of such a cover increases the cost of the outer case.

An object of this invention is to provide a device which can easily remove a short web of paper which cannot be fed in an outer case of a paper processing machine such as a photoprinting machine.

SUMMARY OF THE INVENTION

According to the present invention, there is provided a device for use with a paper processing machine for removing any short web of paper from the paper processing machine, the paper processing machine comprising an outer case, a paper magazine detachably mounted outside of the outer case, a paper processing unit provided in the outer case, and first and second rollers mounted in the outer case for feeding a web of paper inserted into the outer case from the paper magazine to the paper processing unit, the device comprising a first sensor and a second sensor for detecting the paper, the first sensor being provided along the paper feed path between the paper magazine and the outer case, the second sensor being provided downstream of the second feed rollers, the first feed rollers being rotated in a normal direction to feed the paper toward the paper processing unit when the first sensor detects the paper, and being deactivated if both the first sensor and the second sensor have detected the absence of the paper.

According to the present invention, the first sensor may be provided in the outer case upstream of the first feed rollers, the first feed rollers being rotated in a normal direction to feed the paper toward the paper processing unit when the first sensor detects the paper, and deactivated and then reversed until the rear end of the paper comes out of the outer case, if both the first sensor and the second sensor have detected the absence of the paper.

According to the present invention, the first sensor may be provided in the outer case upstream of the first feed rollers, and the device may further comprise a third sensor provided near the paper magazine for detecting the paper magazine, the first feed rollers being rotated in a normal direction to feed the paper toward the paper processing unit when the first sensor detects the paper, and deactivated if both the first sensor and the second sensor have detected the absence of the paper, and reversed if the third sensor has detected that the paper magazine has been removed.

According to the present invention, the first sensor may be provided in the paper magazine, and the paper magazine is further provided with a clamp means downstream of the first sensor, the first feed rollers being rotated in a normal direction to feed the paper toward the paper processing unit when the first sensor detects the paper, and deactivated if both the first sensor and the second sensor have detected the absence of the paper.

According to the present invention, if the first sensor and the second sensor have detected the absence of the paper, the first feed rollers are deactivated. Since the first sensor is provided outside the outer case, the rear end of the paper is located outside the outer case when the first feed rollers have been deactivated. Thus, any paper which cannot be fed in the outer case can be easily removed from the outer case by grabbing its rear end and pulling it back.

According to another embodiment, if both the first sensor and the second sensor detect the absence of the paper, the first feed rollers are deactivated, and then reversed until the rear end of the paper protrudes from the outer case. In this state, the paper can be pulled out of the outer case by grabbing its rear end.

According to a further embodiment, if both the first sensor and the second sensor detect the absence of the paper, the first feed rollers are deactivated. By detaching the paper magazine in this state, the third sensor will detect this fact and produce a signal to reverse the first feed rollers, so that the paper can be pulled out of the outer case automatically.

According to a still another embodiment, if both the first sensor and the second sensor detect the absence of the paper, the first feed rollers are deactivated, so that the feed of the paper is stopped with the rear end of the paper disposed in a position where it can be clamped by the clamp mechanism. By detaching the paper magazine in this state, the rear end of the paper is clamped by the clamp mechanism, so that the paper is pulled out of the outer case.

Other features and objects of the present invention will become apparent from the following description made with reference to the accompanying drawings, in which:

DETAILED DESCRIPTION OF THE PREFERRED EMBODIMENTS

Embodiments of this invention are now described with reference to FIGS. 1–6B.

Figure 1:
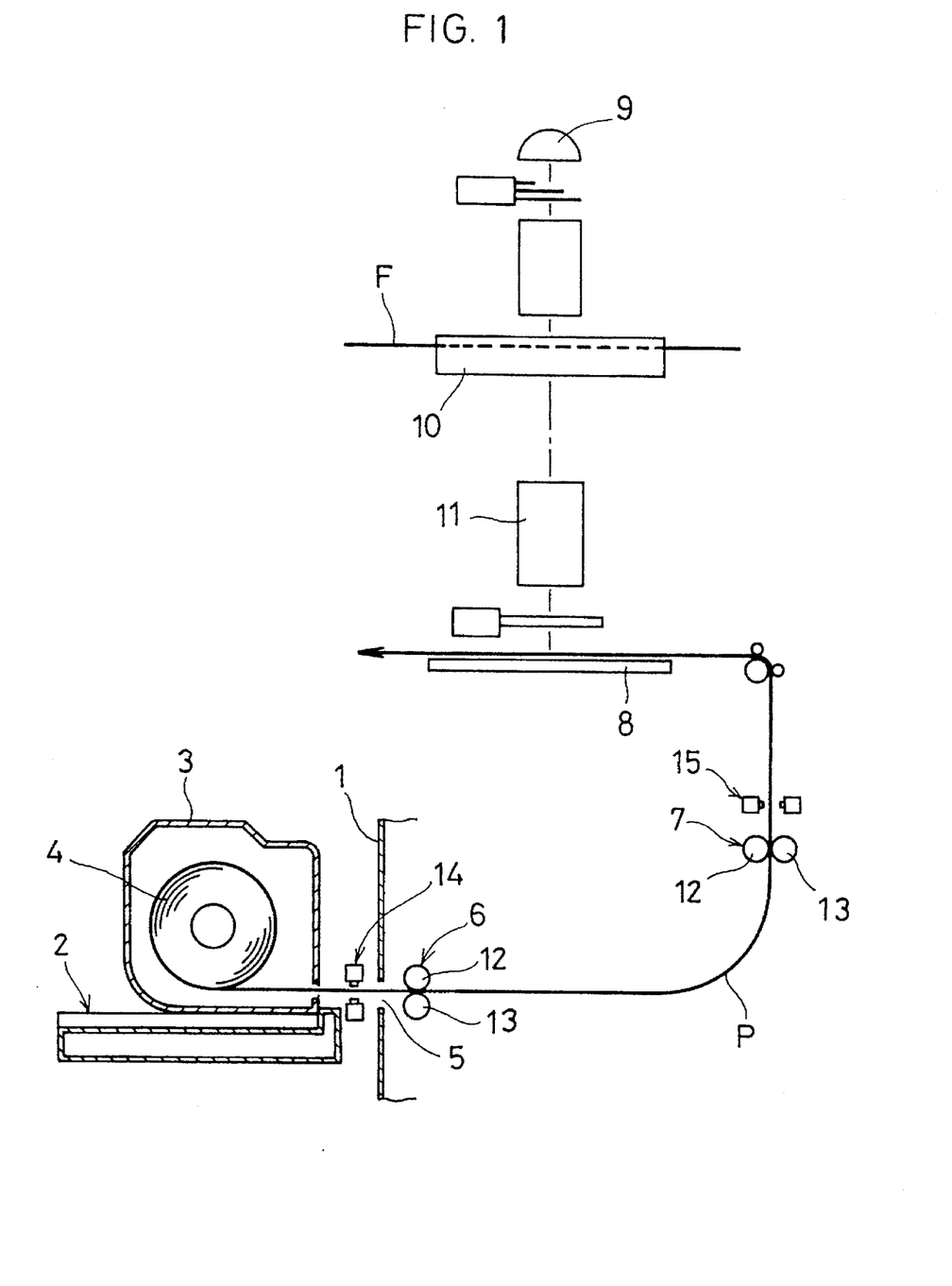
FIG. 1 is a schematic view of a first embodiment according to this invention.
Figure 2A:
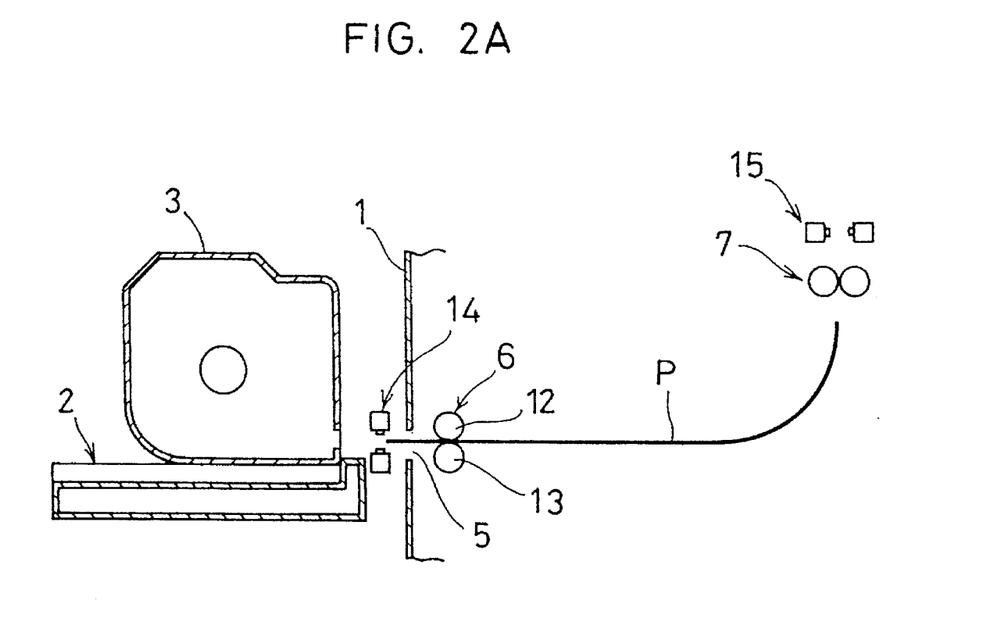
FIGS. 2A and 2B are schematic views of the same showing how it operates.
Figure 2B:
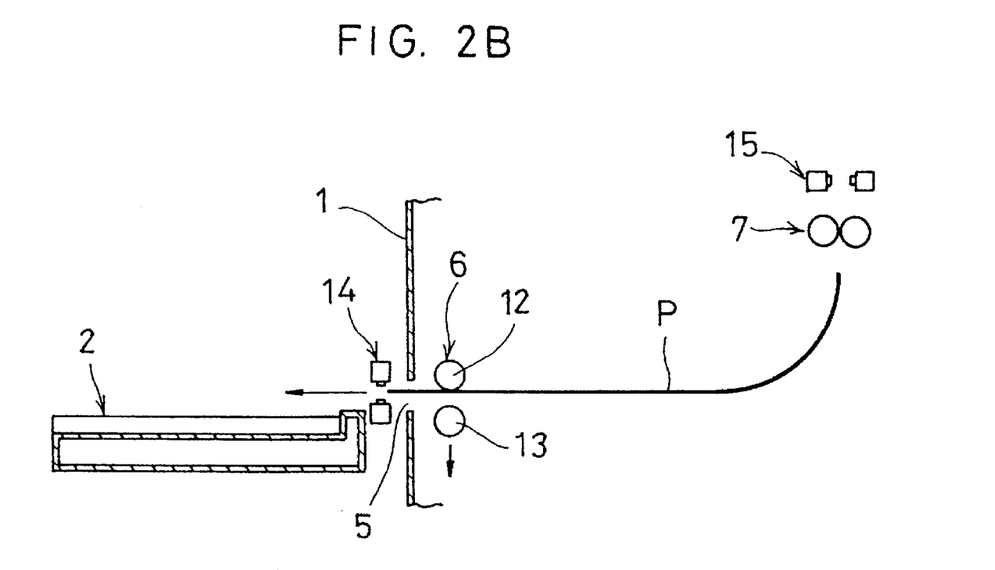

FIGS. 1–2B show the first embodiment of this invention. FIG. 1 shows a photoprinting machine as a paper processing machine. Similar to the printing machine shown in FIG. 7, this printing machine comprises an outer case 1, a magazine support 2 provided outside the outer case 1 for detachably supporting a paper magazine 3, and an exposure table 8 mounted in the outer case 1. A paper P in a roll 4 in the paper magazine 3 is pulled out of the paper magazine, inserted into the outer case 1 through its inlet 5, and fed therein onto the exposure table 8 by means of first feed rollers 6 and second feed rollers 7.

When the paper is fed onto the exposure table 8, negative images formed on a negative film F are printed onto the paper P through a printing lens 11 by irradiating the film F by source a.

The first feed rollers 6 and the second feed rollers 7 comprise a driving roller 12 and a pressure roller 13, respectively. The driving rollers 12 are driven by a motor (not shown).

The pressure roller 13 of the first feed rollers 6 is movable relative to the driving roller 12.

A first sensor 14 for detecting the existence of paper P is provided along the paper feed path from the paper magazine 3 supported on the magazine support 2 to the inlet 5 of the outer case 1.

A second sensor 15 for detecting the existence of paper is provided immediately downstream of the second feed rollers 7. The first sensor 14 and the second sensor 15 may comprise a light emitter and a light receptor.

After pulling the paper P from the roll 4 in the paper magazine 3 so that its leading end protrudes from the paper magazine 3, the paper magazine is set on the magazine support 2, and the leading end of the paper is inserted between the driving roller 12 and the pressure roller 13 of the first feed rollers 6. In this state, the first sensor 14 detects the paper and produces a paper detection signal to rotate the first feed rollers 6 and the second feed rollers 7. The paper P is thus fed toward the exposure table 8.

If the paper P is longer than the distance between the first feed rollers 6 and the second feed rollers 7, it can be fed to the exposure table 8 by the second feed rollers 7.

If the paper P is shorter than such distance, the paper P is fed toward the second feed rollers 7 by the first feed rollers 6.

As shown in FIG. 2A, when the rear end of the paper passes the first sensor 14, the first sensor produces a signal indicating that the paper P has disappeared. In this state, the leading end of the paper has not reached the second sensor 15, so that the second sensor 15 also does not detect the paper P.

Namely, neither the first sensor 14 nor the second sensor 15 detects the paper P in this state. When this happens, the driving roller 12 of the first feed rollers 6 is deactivated to stop the feed of the paper P.

Since the first sensor 14 is provided outside the outer case 1, the rear end of the paper P is still outside the outer case 1 when the feed of the paper P is stopped by deactivating the first feed rollers 6.

In this state, as shown in FIG. 2B, after detaching the paper magazine 3, the paper P easily can be pulled out of the outer case 1 by grabbing it by the rear end protruding from the outer case 1.

In this embodiment, when the feed of the paper is stopped, the pressure roller 13 of the first feed rollers 6 is moved away from the driving roller 12 so that the paper P can be pulled back easily. But the paper P may be pulled back with the pressure roller 13 kept pressed against the driving roller 12.

Figure 3A:
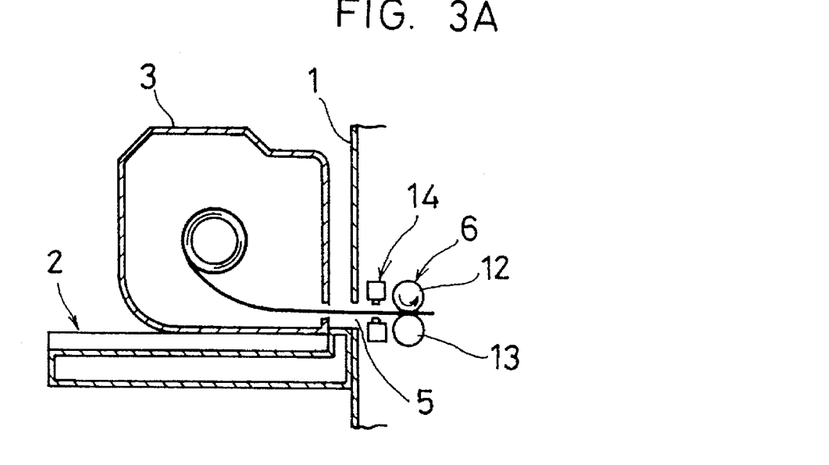
FIGS. 3A, 3B and 3C are schematic views of a second embodiment according to this invention showing how it operates.
Figure 3B:
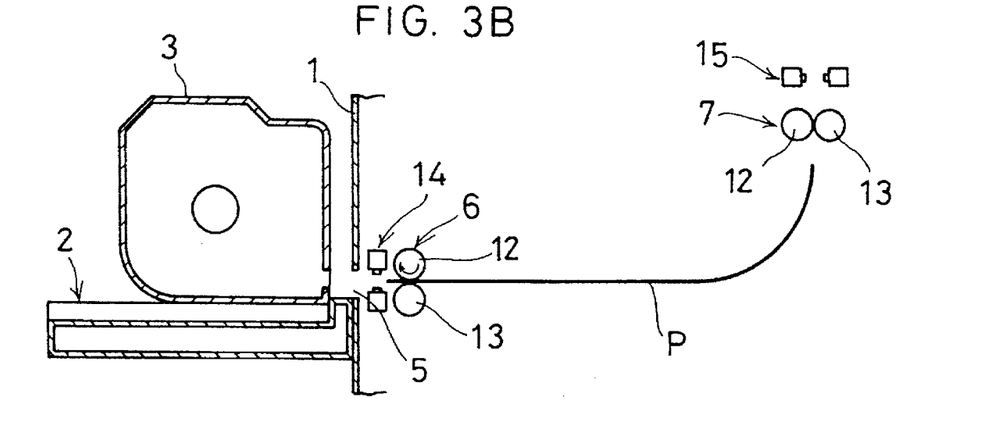
Figure 3C:
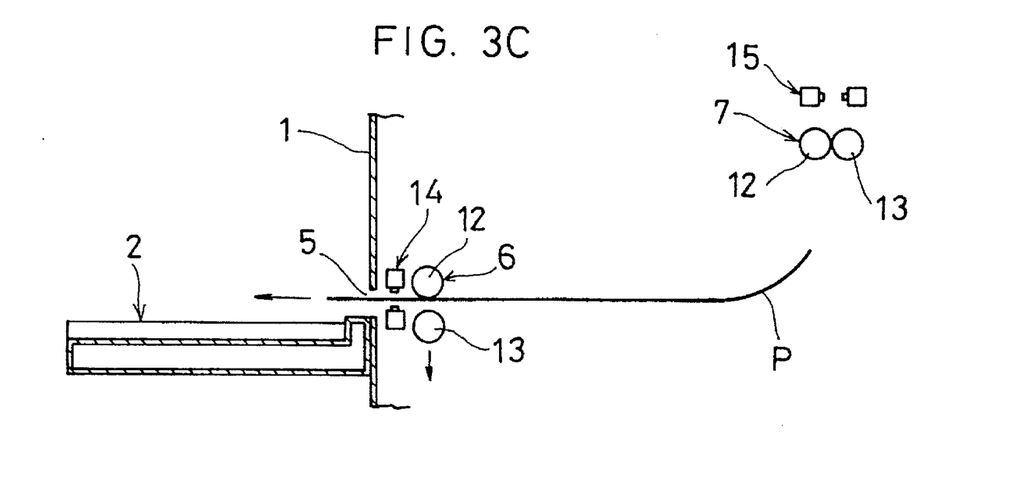

FIGS. 3A–3C show the second embodiment of this invention, in which the first sensor 14 is provided inside the outer case 1, upstream of the first feed rollers 6.

In this embodiment, as shown in FIG. 3A, when the paper P pulled out of the paper magazine 3 is inserted between the pair of rollers 12, 13 of the first feed rollers 6, and the first sensor 14 detects the paper P, the first feed rollers 6 are rotated in the normal direction to feed the paper P forward.

If the paper P fed into the outer case i is shorter than the distance between the first feed rollers 6 and the second feed rollers 7, the former are deactivated when the paper P is not detected by both the first sensor 14 and the second sensor 15. Then, the first feed rollers 6 are turned in reverse for a short period time to pull back the paper P until its rear end passes out of the inlet 5.

In this state, after detaching the paper magazine 3 from the magazine support 2, the paper P can be pulled out of the outer case 1 by grabbing it by the protruding rear end.

Figure 4A:
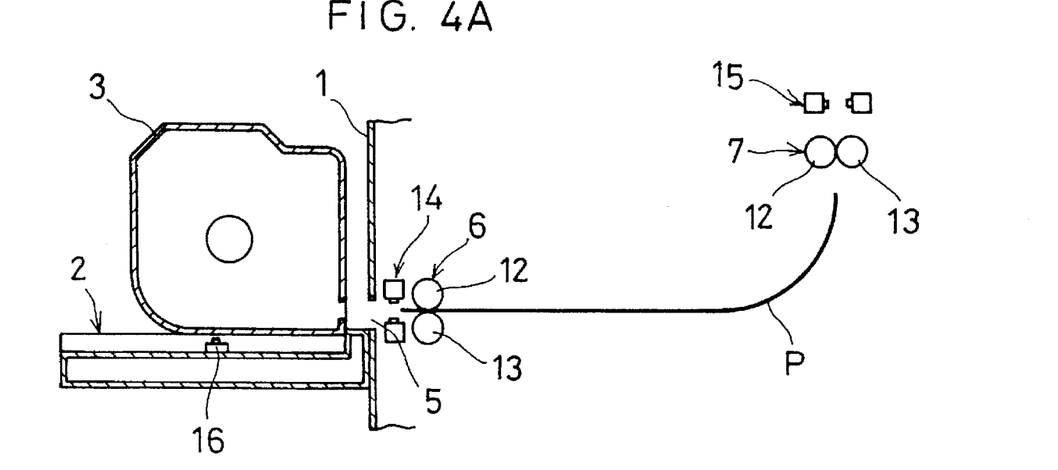
FIGS. 4A, 4B and 4C are schematic views of a third embodiment according to this invention showing how it operates.
Figure 4B:
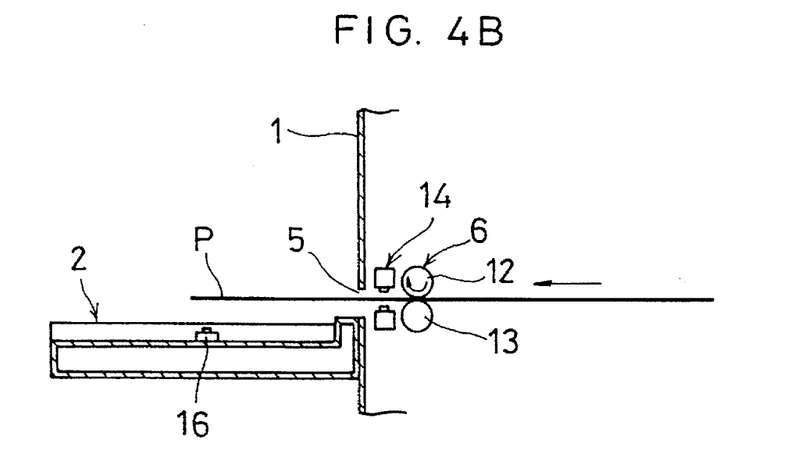
Figure 4C:
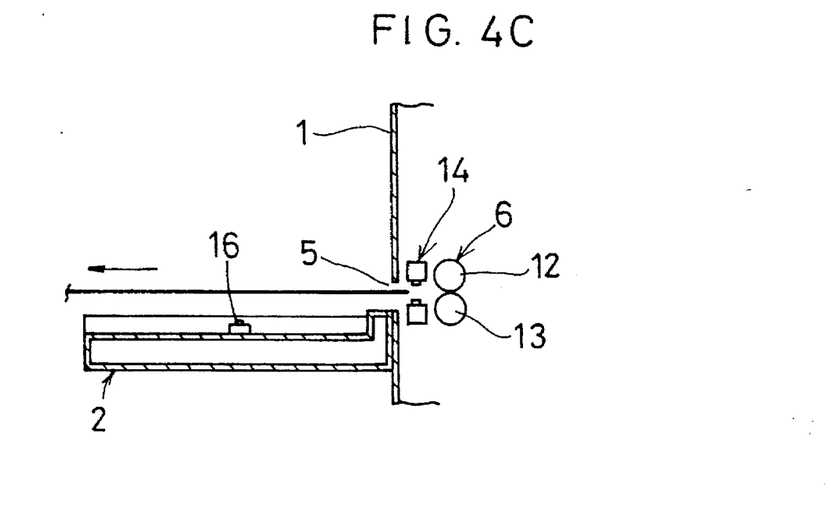

FIGS. 4A–4C show the third embodiment of this invention, in which a third sensor 16 for detecting the paper magazine 3 is provided on the magazine support 2. Otherwise, this embodiment is structurally the same as the embodiment shown in FIGS. 3A–3C. Thus, like elements are denoted by like numerals and their description is omitted.

In the third embodiment, when the paper P pulled out of the paper magazine 3 set on the magazine support 2 is inserted between the rollers 12 and 13 of the first feed rollers 6, and the first sensor 14 detects the paper P, the first feed rollers 6 are rotated in the normal direction to feed the paper P forward.

If the paper P fed into the outer case 1 is shorter than the distance between the first feed rollers 6 and the second feed rollers 7, the first feed rollers 6 are deactivated when the paper P has become undetectable both by the first sensor 14 and the second sensor 15.

After the feed of the paper P has been stopped, the paper magazine 3 is detached from the magazine support 2. When the third sensor 16 detects this fact, the driving roller 12 of the first feed rollers 6 is turned in reverse as shown in FIG. 4B.

By reversing the driving roller 12, the paper P, which cannot be fed forward, can be automatically pulled out of the outer case 1.

Figure 5A:
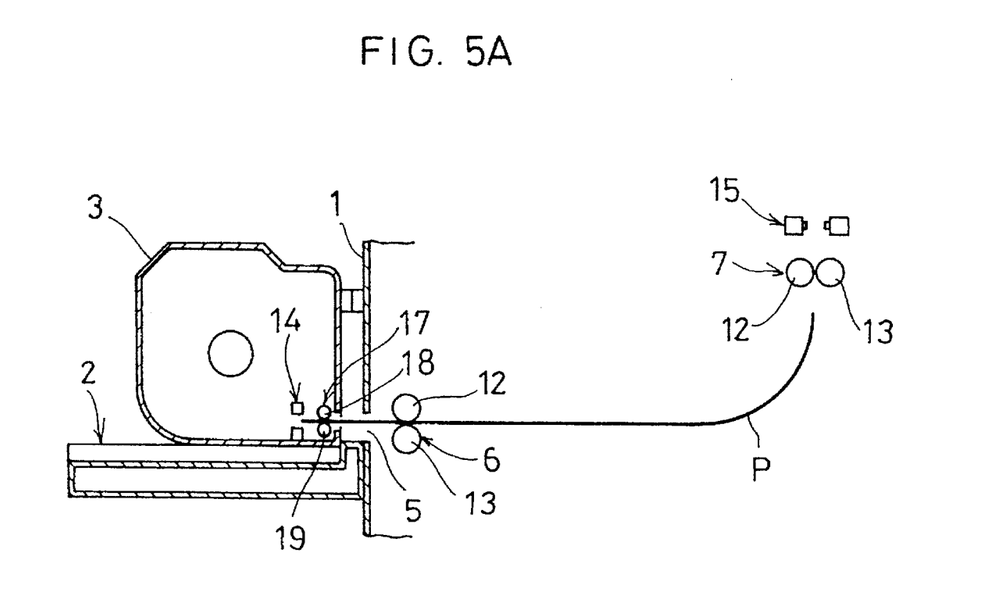
FIGS. 5A and 5B are schematic views of a fourth embodiment according to this invention showing how it operates.
Figure 5B:
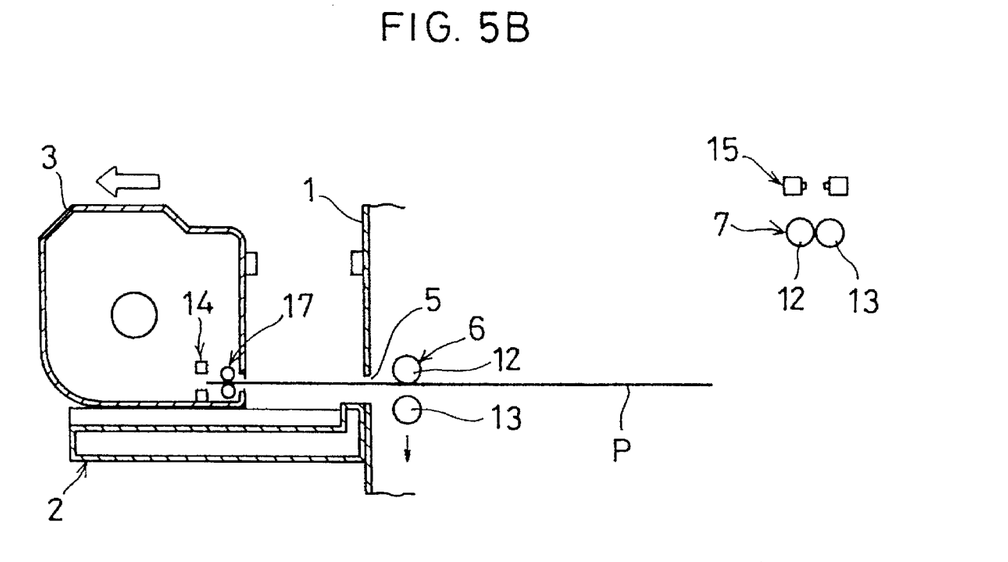

FIGS. 5A–5B show the fourth embodiment of this invention. In this embodiment, the first sensor 14 is provided inside the paper magazine 3. Also mounted in the paper magazine 3 is a paper clamp 17 provided immediately downstream of the first sensor 14.

The paper clamp 17 comprises a pair of rollers 18, 19. One of the rollers 18 is fixed, while the other 19 is movable into contact with and away from the fixed roller 18 by controlling it from outside.

Otherwise, this embodiment is structurally the same as the first embodiment shown in FIG. 1. Thus, like elements are denoted by like numerals and their description is omitted.

In the fourth embodiment, when the leading end of the paper P pulled out of the paper magazine 3 set on the magazine support 2 is inserted between the driving roller 12 and the pressure roller 13 as the first feed rollers 6, and the first sensor 14 detects the paper P, the first feed rollers 6 are activated to feed the paper P toward the exposure table 8.

If the paper P fed into the outer case 1 is shorter than the distance between the first feed rollers 6 and the second feed rollers 7 as shown in FIG. 5A, the first feed rollers 6 are deactivated to stop the feed of the paper when the paper P has become undetectable both by the first sensor 14 and the second sensor 15.

After the feed of the paper P has been stopped, the paper clamp 17 is activated to clamp the paper P. Then, by removing the paper magazine 3 from the magazine support 2, the paper P, which cannot be fed forward, can be pulled out of the outer case 1.

Figure 6A:
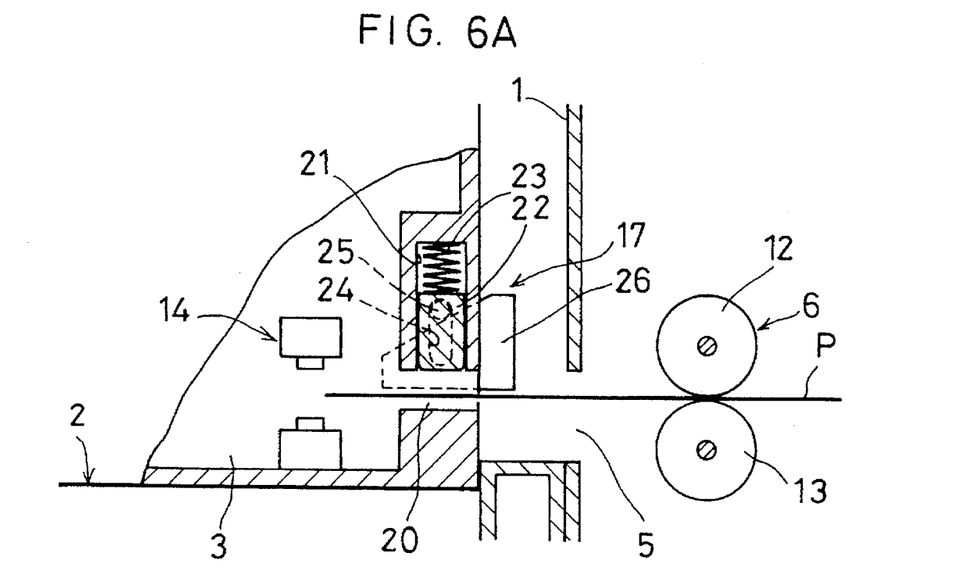
FIGS. 6A and 6B are views of a modified embodiment of a clamp mechanism showing how it operates.
Figure 6B:
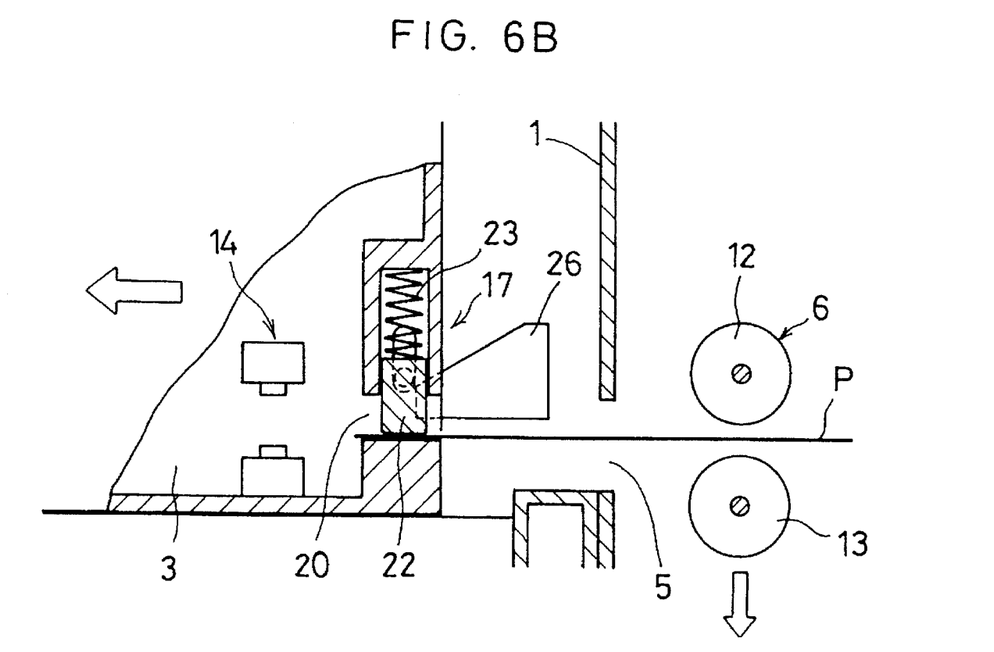

FIGS. 6A–6B show a modified embodiment of the paper clamp 17 shown in FIG. 5. This paper clamp 17 includes a housing space 21 formed over a paper outlet 20. Space 21 accommodates a closure member 22 and a spring 23 biasing the closure member 22 downward. Fixed to one side of the closure member 22 is a pin 25 extending through and protruding outwardly from an elongated hole 24 formed in a side wall forming the housing space 21. On the other hand, a cam member 26 is mounted on one side of the magazine support 2. By setting the paper magazine 3, the pin 25 is pushed up by the cam member 26, so that the closure member 22 is moved to its open position. When the paper magazine 3 is detached, the closure member 22 descends by being biassed by the spring 23, so that the rear end of the paper P is clamped between the closure member 22 and a bottom edge defining the paper outlet 20.

What is claimed is:

1. A device for use with a paper processing machine for removing any short web of paper therefrom, said paper processing machine comprising an outer case, a paper magazine detachably mounted outside of said outer case, a paper processing unit provided in said outer case, and first and second rollers mounted in said outer case for feeding a web of paper inserted into said outer case from said paper magazine to said paper processing unit, said device comprising a first sensor and a second sensor for detecting the paper, said first sensor being provided along a paper feed path between said paper magazine and said outer case, said second sensor being provided downstream of said second feed rollers, said first feed rollers being rotated in a normal direction to feed said paper toward the paper processing unit when said first sensor detects the paper, and being deactivated if both said first sensor and said second sensor have detected the absence of the paper.

2. A device as claimed in claim 1, wherein said first sensor is provided in said outer case upstream of said first feed rollers, said first feed rollers being rotated in a normal direction to feed the paper toward said paper processing unit when said first sensor detects the paper, and deactivated and then reversed until a rear end of the paper comes out of said outer case, if both said first sensor and said second sensor have detected the absence of the paper.

3. A device as claimed in claim 1, wherein said first sensor is provided in said outer case upstream of said first feed rollers, and wherein said device further comprises a third sensor provided near said paper magazine for detecting said paper magazine, said first feed rollers being rotated in a normal direction to feed the paper toward said paper processing unit when said first sensor detects the paper, and deactivated if both said first sensor and said second sensor have detected the absence of the paper, and reversed if said third sensor has detected that said paper magazine has been removed.

4. A device as claimed in claim 1, wherein said first sensor is provided in said paper magazine, and wherein said paper magazine is further provided with a clamp means downstream of said first sensor, said first feed rollers being rotated in a normal direction to feed the paper toward said paper processing unit when said first sensor detects the paper, and deactivated if both said first sensor and said second sensor have detected the absence of the paper.

5. A device as claimed in claim 1, wherein said first sensor is provided outside of said outer case of a location between said magazine and said outer case.

* * * * *